United States Patent Office 2,852,393
Patented Sept. 16, 1958

2,852,393

FOOD COMPOSITION

Ralph W. Kerr, Riverside, and Frank C. Cleveland, Jr., Chicago, Ill., assignors to Corn Products Refining Company, New York, N. Y., a corporation of New Jersey No Drawing. Application November 14, 1956
Serial No. 621,987

5 Claims. (Cl. 99—139)

This invention relates to the preparation of starch phosphate esters wherein the colloidal properties of the starch have been altered primarily by the introduction of distarch phosphate groups, i. e., phosphate cross-linkages, as contrasted to simple monostarch phosphate ester groups. More particularly the invention relates to a process of preparing distarch phosphate esters which retain the granule form of the starch.

Starch phosphate esters which are cross-linked have unusual properties which make them suitable for a number of industrial uses. They are more resistant to gelatinization and pastes made therefrom have increased stability as concerns breakdown by heating compared to untreated starch. In fact, depending upon the degree of cross-linking, starch esters may be prepared which are nongelatinizable in boiling water.

In our copending application, Serial No. 388,914, filed October 28, 1953, there are described and claimed methods for making phosphate esters by heating starch in semidry form with salts of anhydro forms of phosphoric acid, such as metaphosphate, polymetaphosphates, pyrophosphates and polyphosphates. After cooling the starch phosphate is washed to remove impurities. Depending upon conditions, several types of products results: (1) monostarch phosphate, (2) distarch phosphates, and (3) monostarch phosphates wherein there is also an appreciable percentage of distarch phosphate groups.

The methods referred to above possess the inherent disadvantage that in order to remove unreacted salts and by-products an extensive washing step after the dry reaction and an additional drying step are necessary. Rewashing and redrying are not only cumbersome operations in starch manufacturing plants but are also relatively costly.

It is an object of this invention to provide a new and novel process for the production of distarch phosphate esters in granule form. Other objects will appear hereinafter.

We have discovered that distarch phosphate in granule form may be produced by heating an aqueous slurry of ungelatinized starch with a water soluble metaphosphate salt at a temperature sufficiently low to maintain the starch in the unswollen granule state, the pH of the system being preferably at least about 9.0.

The reaction between starch and a metaphosphate salt is understood to proceed as follows:

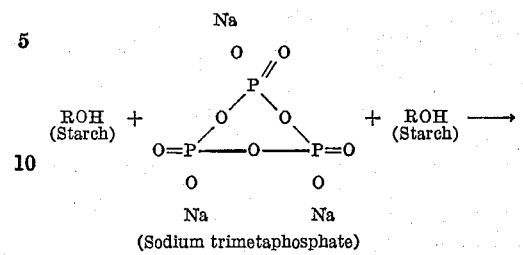

(Sodium trimetaphosphate)

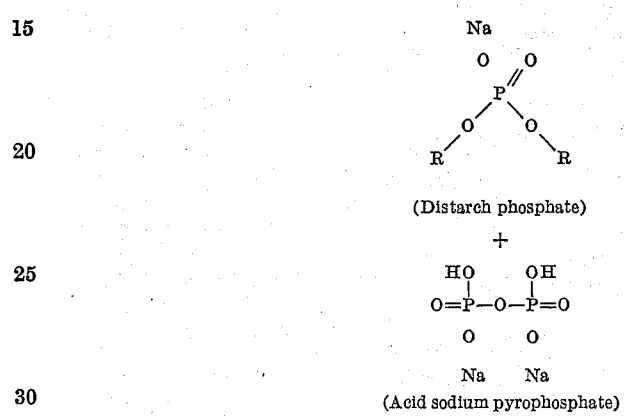

(Distarch phosphate)

+

(Acid sodium pyrophosphate)

Under certain conditions, some monostarch phosphate groups may also be produced but, if so, the amount will be negligible.

The obvious changes accompanying a starch cross-linking reaction are as follows:[1] In the early stages of the reaction, the paste viscosity of the starch increases significantly. In contrast to simple esterification, however, which also may produce increased paste viscosity, clarity of the cross-linked starch paste does not increase in proportion. Also in contrast to simple esterification, the pastes of cross-linked cereal starches become "shorter" and more salve-like (or less cohesive). The opposite is true in simple esterification, after which the pastes have higher clarity and "longer" flow.

As the cross-linking reaction progresses, viscosity reaches a peak and then declines to very low values; simultaneously shortness and opacity increase (clarity decreases). This is due to a progressive decrease in the ability of starch substance to disperse in water as it becomes progressively more cross-linked. However, in these more advanced stages of cross-linking of starch in granule form, the starch may develop relatively high and stable viscosities if gelatinization conditions are made more strenuous, such as, for example, greatly prolonging the ---
[1] See: Kerr, Chemistry and Industry of Starch, 2nd ed., page 470.

cooking time, using autoclave temperatures or adding starch dispersing agents, such as alkali, acid or sugars. Technically, these are important characteristics in that more rugged starches are produced which are stabilized to break down by conditions employed by those who use the starch. For example, the relatively tender waxy starches, such as waxy maize, or the non-cereal starches, such as tapioca, which rapidly deteriorate on cooking in many uses to a thin, slimy paste, may be stabilized by the correct amount of cross-linking so that they actually increase in viscosity as cooking time is extended. Moreover, the cohesiveness of these gels is reduced to a more palatable texture. The same may be said for certain derivatives of the cereal starches, such as corn monostarch phosphates (likes the potato and tapioca starches they so strongly resemble). They also tend to deteriorate on prolonged cooking or at autoclave temperatures or under other adverse conditions more readily than untreated cereal starch. A definite amount of cross-linking converts corn monostarch phosphate into a product quite similar to a cross-linked waxy starch. This is an important development in that some of the undesirable characteristics of starches, such as corn starch, can be changed to desirable characteristics. Finally, in the last stages of cross-linking, the starch becomes insolubilized. Starch in the granule state containing a sufficient number of distarch phosphate groups will not gelatinize even when boiled in water. Such a product may be used as an inert dusting powder, unaffected by moisture or temperature, such as is used in steam sterilization. The product may, accordingly, be used for dusting and lubrication of surgeon's gloves which may be sterilized in the autoclave and the starch will not lose its lubricating or de-tackifying effect.

The process of the present invention is simple and accordingly can be carried out with no difficulty. A slurry of ungelatinized starch in water containing the requisite amount of metaphosphate and having a suitable pH is heated with agitation at a temperature sufficiently low to maintain the starch in the unswollen granule state. In general temperatures between 40° C. and 50° C. are satisfactory, but higher or lower temperatures may be used depending on alkalinity and whether a gelatinization inhibitor is used. After the reaction has proceeded to the desired degree, the resultant distarch phosphate is filtered, washed, the pH adjusted and the product dried.

The invention is applicable to all varieties of raw starch, e. g., corn, tapioca, wheat, waxy sorghum, grain sorghum and the like. Further, the invention is applicable to various modified starches and derivatives of starch, e. g., thin boiling starches, oxidized starches, starch ethers, starch esters and the like. The term "starch," as used in the claims, is intended to include all of the above listed substances.

As previously mentioned, the phosphorylating agents are the water soluble metaphosphates and polymetaphosphates and of these sodium trimetaphosphate is the preferred reagent. Although some commercial samples of other phosphates, e. g., sodium tripolyphosphate produced an appreciable degree of esterification of starch in aqueous slurry, others did not, and it is thought that metaphosphate impurities were responsible for the esterification in the former case. The pyrophosphates appear to give very little, if any, reaction with starch in the wet state.

The phosphorylation of starch in accordance with the present invention proceeds more efficiently at a high pH, preferably at 11.0 or above although a pH of about 9.0 is satisfactory. Various alkaline materials, e. g., sodium hydroxide, sodium carbonate, lime, and the like may be used to make the pH adjustment.

The amount of metaphosphate required to produce cross-linking sufficient to show an increase in the viscosity of starch is quite small, i. e., of the order of about 0.03 percent, based on the dry weight of the starch, when the time of the reaction is one hour, the temperature 50° C., and the pH 11. Under these same conditions of time, temperature and pH, about 0.6 percent of metaphosphate will make the starch nongelatinizable in boiling water. Although amounts higher than about 0.6 percent are not detrimental for these conditions, such amounts serve no useful purpose. The reaction proceeds faster with increased temperature, and pH, and with increased amount of metaphosphate up to the point where the starch becomes nongelatinizable. If temperatures below 50° C. are used, it is obvious that correspondingly more metaphosphate should be used if time and pH are the same. A practical operating range of metaphosphate is about 0.01 to about 3 percent.

It has been found that the concentration of sodium added as a sodium salt has an effect on the degree of phosphorylation, the higher the concentration (within practical limits) the higher the degree of phosphorylation. A total sodium ion concentration of about 0.4 mole per liter gives satisfactory results.

The following examples, which are intended as typical and informative and in no way limiting the invention, will further illustrate the invention.

EXAMPLE 1

*Production of high viscosity, partially cross-linked corn starch: The effect of time on the reaction between starch and sodium trimetaphosphate in aqueous slurry at pH 10.2 and 50° C.*

One mole of corn starch (180 grams at 10 percent moisture content) was suspended in 325 ml. of water into which had been dissolved 3.3 grams of commercial sodium trimetaphosphate (Victor Chemical Company) and sufficient sodium carbonate buffer (5.45 grams) to adjust the pH of the starch slurry to 10.2. The slurry was heated to 50° C. with stirring and held at this reaction temperature. Samples were removed at intervals shown in Table I, filtered, washed and adjusted to pH 6.7 with hydrochloric acid and dried.

Scott viscosity tests were made on these samples in accordance with procedures described in Kerr, Chemistry and Industry of Starch, 2nd edition, pp 119–121. Results were as follows:

TABLE I

[Reaction of corn starch with sodium trimetaphosphate (2%) in aqueous slurry at pH 10.2 and 50° C.]

| Reaction Time, Min. | Scott Viscosity,(a) Sec/50 ml. |
| --- | --- |
| 0 (untreated) | 93 |
| 40 | 105 |
| 50 | 147 |
| 60 | 131 |
| 70 | 103 |
| 80 | 90 | a Unless otherwise specified, viscosity tests were run using 15 grams of starch at 12 percent moisture content in 280 ml. water.

The viscosity of the heat gelatinized samples increased to a maximum in about 50 minutes' reaction time and then decreased as the cross-linking reaction continued. A sample taken from the reaction mixture after 24 hours would not gelatinize when boiled in water.

The high viscosity sample taken after 50 minutes' reaction time formed a paste which was more opaque and less cohesive than untreated corn starch and by analysis had a phosphorus content of 0.03 percent. This starch when made into adhesive formulations suitable for pasting paper products, such as paper bags or corrugated paper board, gave higher bodied pastes which permitted the use of greater dilutions than untreated corn starch;

moreover, the cross-linked starch paste had better stability with use, that is, maintained its viscosity with time and agitation better than untreated corn starch.

EXAMPLE 2

Procedures given in Example 1 were repeated with the exception that only one gram of sodium trimetaphosphate was used per 180 grams of corn starch (at 10 percent moisture content) and 6.65 grams of sodium carbonate was added.

Samples were removed at time intervals shown in Table II, washed, neutralized and dried. Paste clarity of pastes made from these samples was determined as follows: A slurry of the starch product in water is adjusted to pH 6.5 and at about 1 percent concentration. The flask is then immersed in boiling water for 30 minutes with occasional stirring, then cooled to 25° C. and adjusted in volume so as to contain 1 gram starch per 100 ml. At 25° C., the paste is introduced into a 13 mm. cell of a Coleman spectrophotometer, the light wave adjusted to $\lambda = 650$ m$\mu$ and the percent light transmission determined, using distilled water as reference for 100 percent light transmission.

TABLE II

[Reaction of sodium trimetaphosphate with corn starch (one gram/180 grams) in aqueous slurry at pH 10.2 and 50° C.]

| Reaction Time, Min. | Scott Viscosity, Sec./50 ml. | Clarity of 1% Pastes As Percent Light Transmission at $\lambda = 650$ m$\mu$ |
|---|---|---|
| 0 (untreated) | 93 | 20 |
| 45 | 106 | |
| 60 | 118 | 22 |
| 80 | 172 | |
| 100 | 140 | 19 |
| 120 | 96 | 18 |
| 180 | 34 | 15 |
| 240 | 23 | 13.5 |
| 1,440 | 11 | 7 |

Again it will be observed that the Scott viscosity of the products increased to a maximum and then declined. Clarity of pastes, in general, declined as cross-linking progressed. The effect of lower concentration of sodium trimetaphosphate under these conditions was to retard the esterification so that now the peak viscosity starch phosphate was not obtained until approximately 80 minutes' reaction time.

EXAMPLE 3

*The effect of lower trimetaphosphate concentration in aqueous starch slurries at the higher pH value of 11 and at 50° C.*

Even still lower trimetaphosphate concentrations than used in Examples 1 and 2 were found to be effective in producing all degrees of cross-linking in corn starch. However, the reaction was accelerated by using the higher pH value of 11 in this experiment.

One molar weight of corn starch was stirred into 220 ml. of water into which had been dissolved 4.52 grams of sodium carbonate and the amounts of sodium trimetaphosphate shown in Table III. Just prior to adding the starch, 4 ml. of 10 N sodium hydroxide was stirred into the reaction solution. The pH value of the slurry was 11. The reaction mixture was held at 50° C. for one hour then cooled to room temperature, adjusted to pH 6.5 with hydrochloric acid, washed and dried. A series of such reactions was run using varying amounts of sodium trimetaphosphate between 0.05 and 1.0 grams. The Scott viscosities of these products are shown in Table III.

TABLE III

[Effect of lower trimetaphosphate concentrations on aqueous slurries of starch at pH 11 (50° C. for one hour).]

| Sodium Trimeta-phosphate Added Per 180 g. Corn Starch, grams | Scott Viscosity, Sec./50 ml. | Stormer Test, Sec./50 rev. |
|---|---|---|
| 0 (untreated) | 94 | Gel. |
| 0.05 | 120 | Too thick. |
| 0.10 | 154 | Do. |
| 0.15 | 190 | 495. |
| 0.175 | 109 | 102. |
| 0.20 | 94 | 67. |
| 0.25 | 47 | 41. |
| 0.50 | 18 | |
| 0.75 | 13 | |
| 1.00 | 12 | 3. |

It will be observed from the results in Table III that at pH 11 and 50° C. as little as 0.15 gram of sodium trimetaphosphate per 180 grams corn starch at 10 percent moisture content produced a peak Scott viscosity starch product within one hour by the aqueous slurry method.

Under these conditions also, as little as 0.75 to 1.0 gram of sodium trimetaphosphate produced a starch product so completely cross-linked that when it was held in boiling water bath for 15 minutes, it had no Scott viscosity that could not be accounted for by 15 grams of unswollen starch granules in 280 ml. of water. Water alone gives a Scott viscosity of 11 seconds.

This example illustrates additionally the higher reaction rate at pH 11 than was obtained at pH 10.2 in Examples 1 and 2.

Pastes of several of the products used for Scott viscosity were cooled to 25° C. and after one hour at this temperature were placed in the cup of a Stormer viscometer. A 175 gram weight was used to actuate the spindle and the seconds noted for 50 revolutions. As indicated in Table III pastes made from untreated corn starch set to a rigid gel atfer one hour and pastes from starch treated with 0.05 and 0.10 gram of trimetaphosphate, were too thick to measure by this test. The peak Scott test starch however was fluid, although quite thick and relatively short in body. As the concentration of trimetaphosphate used was increased, cold paste body at one hour decreased until finally only a watery suspension was obtained. As the extent of cross-linking was increased, the cold pastes became increasingly less cohesive and salve-like.

EXAMPLE 4

*Effect of added cation on the reaction between trimetaphosphate and starch in aqueous slurry*

The equation given for this reaction between starch and trimetaphosphate indicates that acid groups (acid sodium pyrophosphate) are produced during the reaction. Since the reaction proceeds more readily at higher pH values, one function of the added carbonate in Examples 1 to 3 is to act as buffer. However, the added sodium also appears to act beneficially on the phosphorylation as well. If sufficient alkali is added to maintain a high pH value, then on a molar basis sodium in NaCl is as effective as in $Na_2CO_3$.

Three reaction mixtures were set up as follows: 180 grams of corn starch (at 10 percent moisture content) was stirred in 320 ml. of water into which had been dissolved one gram of sodium trimetaphosphate and 4 ml. of 10 N NaOH. To one, 4.52 grams of $Na_2CO_3$ was also included and to a second, 5 grams of NaCl had been added; the third contained no further additions. All three were stirred for 2 hours at 50° C., then cooled, neutralized with HCl, washed with water and dried.

Data on these products are shown in Table IV.

TABLE IV

[Effect of sodium concentration on the reaction between starch and trimetaphosphate.]

| Additions of Sodium in Moles×10³/100 ml. from— | | | | Total Sodium Concentration in Moles ×10³ Per 100 ml. | Scott Vis., Sec./50 ml. | Stormer Test, Sec./50 rev. |
|---|---|---|---|---|---|---|
| (NaPO₃)₃ | NaOH | NaCl | Na₂CO₃ | | | |
| 2.9 | 11.7 | ---- | 25.0 | 39.6 | 13 | 3.5 |
| 2.9 | 11.7 | 25.0 | ----- | 39.6 | 12 | 3.0 |
| 2.9 | 11.7 | ---- | ----- | 14.6 | 120 | 850 |

In all cases during these reactions, the alkalinity was within the range pH 11.2 to 11.6. Actually, the pH value of the reaction mixture containing only NaOH and the trimetaphosphate was slightly higher than the others. Nevertheless, at the end of 2 hours, the cross-linking reaction in this case had only advanced to the region of a super-viscosity starch whereas with either sodium carbonate or sodium chloride added, the cross-linking reaction had proceeded to the stage where the starch was substantially ungelatinized by the Scott viscosity cooking procedure.

EXAMPLE 5

*Use of lime as catalyst instead of sodium hydroxide and carbonate to produce a peak Scott viscosity corn starch diphosphate*

One molar weight of corn starch was stirred into 255 ml. of water into which had been dissolved 2.37 grams of commercial calcium hydroxide (assay 93 percent) and 0.81 gram of sodium trimetaphosphate. The slurry was stirred for 2 hours at 45° C. and then cooled to room temperature. The pH was 11.5.

The slurry was filtered, washed with water and adjusted to pH 6.2 with hydrochloric acid.

A high viscosity, partially cross-linked starch resulted having a Scott viscosity test of 150 seconds per 50 ml.

EXAMPLE 6

*Production of a non-gelatinizable, mobile dusting powder*

1100 grams of corn starch was stirred into 1300 ml. of water into which had been dissolved 33 grams of sodium trimetaphosphate, 30 grams of sodium carbonate, and 11 grams of sodium hydroxide. The pH value was 11.2. This slurry was stirred at 50° C. for 24 hours.

At the end of this time, the slurry was cooled to room temperature and a portion (part A) was removed, adjusted to pH 6.5 with hydrochloric acid, thoroughly washed in water and dried.

During purification of the balance (part B) of the reaction mixture sufficient calcium chloride was added so that when washing of the product was terminated and the product dried, the starch powder contained an amount of calcium equivalent to 0.25 percent calcium phosphate.

This dry starch powder was found to be very mobile and useable as a dusting powder, particularly as a surgical rubber dusting powder, because of its great resistance to gelatinization as shown below; surgical rubber gloves are sterilized before use by steam autoclaving and accordingly any dusting powder used on the gloves must withstand steam sterilization.

Both starch products made in this example were treated as follows: 5 grams of product was stirred into 100 ml. of water and heated in a boiling water bath for 20 minutes. The heated mixture was adjusted to 100 ml. in volume and poured into a 100 ml. graduated cylinder. After 24 hours at room temperature, it was noted that substantially all of the starch had settled out. The volume of sedimented starch was noted and is shown below. Two other commercial starch products sold under the trademarks "Biosorb" and "Vulca-100," as non-gelatinizing products were tested in comparison.

TABLE V

| Sample | Percent Calcium Phosphate | pH Value of Heated Aqueous Suspension | Gelatinization Test, ml. of Starch Sediment |
|---|---|---|---|
| Example 6-A | 0 | 7.1 | 19 |
| Example 6-B | 0.25 | 7.2 | 22 |
| Vulca-100 | | | 20 |
| Biosorb | | | 32 |
| Untreated Corn Starch | 0 | 7.0 | 100 |

EXAMPLE 7

*Effect of pH value on the reaction of starch in aqueous slurry with sodium trimetaphosphate*

Procedures substantially the same as given in Example 2 were repeated with the exception that either sufficient sodium hydroxide or hydrochloric acid was incorporated into the formulation to give reaction pH values of approximately 11, 9 and 8, instead of the pH value of approximately 10, used in Example 2. Below in Table VI are the results of these experiments compared to those of Example 2, using Scott test as a measure of reaction.

TABLE VI

[Reaction of aqueous slurries of corn starch with sodium trimetaphosphate at 50° C. and at pH values of 8, 9, 10 and 11.]

| Reaction Time, Min. | Scott Viscosity Values Of Products from Reactions at pH Values | | | |
|---|---|---|---|---|
| | pH 8 | pH 9 | pH 10 | pH 11 |
| 0 (untreated) | 93 | 93 | 93 | 93 |
| 5 | | | | 119 |
| 30 | | | | 38 |
| 45 | | | 106 | 28 |
| 60 | | | 118 | 20 |
| 80 | | | 172 | 16 |
| 100 | 93 | 100 | 140 | |
| 120 | | 100 | 96 | 13 |
| 180 | 93 | 107 | 34 | |
| 240 | 90 | 112 | 23 | |
| 300 | 92 | 108 | 19 | |
| 1,440 | 134 | 49 | 11 | |
| 2,880 | | 17 | | |

The results show the great retardation in rate of cross-linking by trimetaphosphate when the pH value is lowered over the range from 11 to 8. Whereas at pH 11, the peak viscosity occurred within the first 5 minutes, at pH 10 the time was about 80 minutes, for pH 9 sometime after 180 minutes and at pH 8 sometime after 24 hours. Extensive cross-linking (Scott values less than 20) requires less than 2 hours at pH 11, 5 hours at pH 10, about 48 hours at pH 9 and may not occur at all at pH 8, since the reagent is hydrolyzed within several days at this temperature and pH 8.

EXAMPLE 8

*Production of partially cross-linked waxy sorghum starch with trimetaphosphate in aqueous slurry at pH 10.2; stabilized waxy starch*

350 grams of waxy grain sorghum starch was stirred into 648 ml. of water into which had been dissolved 2 grams of sodium trimetaphosphate and 13.3 grams of sodium carbonate. The pH of this slurry was 10.2. The slurry was stirred at 50° C. and samples were removed at time intervals shown in Table VII. These samples were filtered, the starch product washed in water, adjusted to pH 6.0 with hydrochloric acid, filtered and dried. Viscosity characteristics of these cross-linked waxy starches are shown below.

TABLE VII

[Reaction of aqueous slurries of waxy grain sorghum starch with trimetaphosphate at pH 10.2 and 50° C.]

| Reaction Time, Min. | Clarity of 1% Pastes as Percent Light Transmission at λ=650 mμ | Scott Viscosity,[a] Sec./50 ml. | Stormer Test,[a] Sec./50 rev. |
|---|---|---|---|
| 0 (untreated) | 44 | 157 | 56 |
| 15 | 23 | 288 | 200 |
| 30 | 19.5 | 309 | 145 |
| 45 | | 196 | 109 |
| 60 | 16 | 186 | 92 |
| 75 | 15.5 | 83 | 53 |
| 90 | | 53 | 33 |
| 120 | 13 | 32 | 16 |

[a] In these tests only 12 grams of starch product was used in 280 ml. of water.

Again a cross-linking reaction is indicated by the results that as the reaction progressed the Scott viscosity increased to a maximum and then rapidly decreased. Progressively with this change, the cohesive nature of cooked and cooled waxy starch became less.

The product made at 75 minutes' reaction time, that is, with a degree of cross-linking considerably more than enough to bring the starch product to a peak viscosity, is a type of stabilized waxy starch product of considerable technical importance. When untreated waxy sorghum or waxy maize starch is gelatinized in water at the boiling point the viscosity increases rapidly to a very high value and then progressively decreases to very low value. Cold pastes are "long" and slimy and as cooking progresses, they become relatively thin in consistency. The deterioration in viscosity of waxy starch on cooking is accentuated by the presence of acids and sugars. Therefore, although waxy starches have inherently the properties of giving pastes of high clarity and freedom from set back to irreversible gels, they are not acceptable as thickening agents in many application, such as, for example, making of fruit pies, production of gum confections, such as gum drops or orange slices, and the canning of cream style corn. However, the waxy starch with a degree of cross-linking as represented by the sample produced in 75 minutes' reaction time, is eminently suited for use as a thickening agent for applications above enumerated as well as many others because of the stabilization of viscosity effected by the phosphate cross-linking. As the starch product is cooked, the viscosity rapidly approaches a useable value and thereafter the viscosity remains relatively constant. Even when cooked in the presence of acids, such as citric, or sugars, or cooked under pressure, the pastes show a remarkable stability. As these pastes are cooled, they remain fluid and of acceptable body and moreover, the texture is very much less cohesive and slimy than untreated waxy starch pastes.

EXAMPLE 9

*Stabilizing corn monostarch phosphate by treatment in aqueous slurry with trimetaphosphate*

Corn starch was esterified in a semidry reaction with sodium tripolyphosphate, in accordance with the method described in copending application, Serial No. 388,914, filed October 28, 1953, as follows: One molar weight of corn starch (180 grams at 10 percent moisture) was stirred into 215 ml. of water into which had been dissolved 15.5 grams of sodium tripolyphosphate. The pH was approximately 8.5. The starch was filtered by suction to form a cake of approximately 45 percent moisture content. This was dried at 60° C. to approximately 12 percent moisture content. By analysis, 9 grams of the polyphosphate (0.08 mole calculated as a sodium monophosphate) was retained by the starch, the balance being in the aqueous filtrate.

This starch was now heated with stirring, and with provision for moisture removal, at temperatures between 120° C. and 130° C. and then cooled. The starch product suspended in 250 ml. of water, now showed a pH of 7.0. It was filtered and washed twice more by suspension in 250 ml. of water followed by filtration with suction. The starch was then dried to a commercial moisture content of approximately 10 percent for a powdered starch.

The product contained 0.37 percent phosphorus, equivalent to a starch phosphate ester with a D. S. of 0.03 as orthophosphate groups. The starch when gelatinized by heating in water formed a very viscous sol (as indicated by Scott viscosity value) with little or no tendency to gel or increase in viscosity with age (as indicated by Stormer consistency values). The sol had very high clarity compared to untreated corn starch (both measured at pH 6.5) and had "long" flow characteristics similar to tuber or waxy starches.

The monostarch phosphate thus obtained was treated in an aqueous slurry with sodium trimetaphosphate by procedures the same as used in Example 8. A product was obtained with stabilized paste properties quite similar to the 75 minute reaction product of the waxy sorghum starch of Example 8; the untreated monostarch phosphate showed unstable paste properties similar to untreated waxy sorghum starch.

EXAMPLE 10

*Stabilizing hydroxyethyl corn starch ether by treatment in aqueous slurry with trimetaphosphate*

A commercial sample of hydroxyethyl corn starch of low D. S. (0.05) and in the granule state was stabilized by introducing phosphate cross-linkages as follows: 162 grams (dry basis) of the starch ether was stirred into 324 ml. of water into which had been dissolved one gram of sodium trimetaphosphate and 6.66 grams of sodium carbonate. The pH value of the slurry was 10.2. The slurry was heated at 50° C. and samples were removed at time intervals, as shown below. These samples were cooled to room temperature, adjusted to pH 6.5 with hydrochloric acid, filtered, washed in water and dried.

Scott viscosities and Stormer consistency values were determined using 13 grams of product (at 12 percent moisture content) in 280 ml. of water.

TABLE VIII

| Reaction Time, Min. | Scott Viscosity, Sec./50 ml. | Stormer Consistency, Sec./50 Revolutions | |
|---|---|---|---|
| | | 1 hr. at 25° C. | 24 hrs. at 25° C. |
| 0 (untreated, HE-starch) | 89 | 171 | 205 |
| 30 | 47 | 76 | 86 |
| 60 | 28 | 51 | 56 |
| 120 | 25 | 40 | 41 |

Peak viscosity was reached between 0 and 30 minutes but was not measured.

It will be observed that as cross-linking progressed, the product showed progressively less tendency to thicken up when pasted, cooled and aged. Moreover, the ether which had been cross-linked by trimetaphosphate treatment (for example, the product at 120 minutes) was more stable at elevated temperatures and formed a less slimy paste when cold. The latter change in character is desirable in many applications for applying adhesives and sizes made from modified starches.

EXAMPLE 11

*Stabilizing an oxidized thin boiling corn starch by treatment in aqueous slurry with sodium trimetaphosphate*

A commercial sample of a thin boiling starch made by oxidizing corn starch in the granule state with alkaline sodium hypochlorite was treated as follows: 180 grams of the starch at 10 percent moisture content was stirred into 220 ml. of water into which had been dissolved 3.3 grams of sodium trimetaphosphate, 4.52 grams of sodium carbonate and sufficient sodium hydroxide to adjust the final slurry to pH 11. The starch slurry was stirred and heated at 50° C. for 90 minutes. The slurry was cooled and filtered and the starch, still in the granule state, was washed in water, neutralized with hydrochloric acid, filtered and dried.

Scott viscosity was determined using 28.35 grams of starch in 280 ml. of water and found to be 102 seconds per 100 ml. A duplicate viscosity determination was run with the exception that the paste was held in a boiling water bath for 90 minutes instead of the 15 minutes, used in the Scott test. The viscosity was now 72 seconds per 100 ml. An otherwise untreated, oxidized corn starch commonly used in textile sizing operations was tested similarly. The Scott test (28.25 g. in 280 ml.) was 108 after the usual 15 minutes pasting period. Heated for 90 minutes in a boiling water bath, however, the viscosity was now only 32 seconds. Thus the untreated oxidized starch had lost about 70 percent of its viscosity on being held for 75 minutes in the vicinity of holding temperatures used in textile mills for sizes, such as, for example, warp sizes. This loss amounts to almost 1 percent per minute and is highly objectionable from a textile sizing operation standpoint. The stabilized, oxidized starch of this example, however, lost only 29.4 percent of its viscosity during a comparable period. Moreover, the paste of the stabilized starch set back, or jelled, less on cooling and standing, an added advantage in mills where left over size is held from one day's operation to the next.

EXAMPLE 12

*Cross-linking corn starch with sodium metaphosphate*

A sample of commercial sodium metaphosphate was found to be partially insoluble in water. About 60 percent of the sample dissolved. The dissolved portion which contained one gram of dry solids was included in the 324 ml. of make-up water in which 180 grams of corn starch was suspended. 6.66 grams of $Na_2CO_3$ was added and the final pH value of the starch slurry was 10.2. The slurry was stirred at 50° C., and periodically samples were removed, adjusted to pH 6.5 with HCl, filtered, washed in water and dried. Scott viscosities of these products are shown in Table IX.

TABLE IX

[Reaction of sodium metaphosphate with corn starch (one gram/180 grams) in aqueous slurry at pH 10.2 and 50° C.]

| Reaction Time, Min. | Scott Viscosity, Sec./50 ml. | Clarity of 1% Pastes as Percent Light Transmission at $\lambda=650$ m$\mu$ |
|---|---|---|
| 0 (untreated) | 93 | 20 |
| 45 | 110 | |
| 60 | 139 | 21 |
| 75 | 146 | |
| 90 | 159 | 19 |
| 105 | 123 | |
| 120 | 104 | 18 |
| 180 | 55 | 16 |
| 240 | 29 | |
| 360 | 17 | 12.5 |

Comparing these results with those given in Table II, Example 2, where one gram of sodium trimetaphosphate was used per 180 grams of corn starch in aqueous slurry at pH 10.2 and 50° C., it is apparent that the action of sodium metaphosphate is comparable to that of sodium trimetaphosphate.

EXAMPLE 13

*Cross-linking corn starch with sodium hexametaphosphate*

Corn starch was made into a slurry with a 10 percent aqueous solution of sodium hexametaphosphate that contained sufficient sodium hydroxide to give a pH value of 11.1 to the final reaction mixture. The aqueous suspension had a density corresponding to 22° Bé. at 30° C. The reaction mixture was stirred at 50° C. for 24 hours then cooled, adjusted from pH 11.0 to 6.5 with hydrochloric acid, filtered, thoroughly washed and dried.

The dried product when resuspended in water and heated for 15 minutes in a boiling water bath as in running the Scott viscosity by determination remained substantially ungelatinized.

EXAMPLE 14

*Use of distarch phosphate in cherry pie fillings*

Canned cherry pie fillings were prepared as follows: 3.5 lbs. of distarch phosphate, as prepared in accordance with Example 8 (75 minute sample), was stirred into 16 lbs. of water to make a slurry.

This slurry was added to a batch of cooked cherries prepared as indicated below. A mix was made up of the following ingredients:

| | |
|---|---|
| Drained cherries (frozen and thawed) (5 parts cherries +1 part sucrose), total _____ lbs__ | 64 |
| Cherry juice (5 parts juice +1 part sucrose), total _____ lbs__ | 21 |
| Sucrose _____ lbs__ | 8 |
| Corn sirup_____ lbs__ | 4 |
| Artificial color _____ oz__ | 0.15 |

The mix was stirred slowly while cooking to 190° F. At this time the distarch phosphate slurry was added and the temperature was raised to and held at 196° F. for 10 minutes.

Thereupon the hot prepared pie fillings were poured into cans and sealed. The cans were then immersed in boiling water for 10 minutes and cooled to room temperature.

Cherry pie fillings were similarly prepared using untreated waxy sorghum starch.

At periodical intervals, over several weeks time, cans of each of the two pie fillings were opened. Fillings made containing the distarch phosphate remained fluid but of satisfactory consistency and the liquid portion was clear. Fillings made of untreated waxy starch were unacceptably fluid as made, and after about two days, were of a watery consistency.

Cherry pies were made and baked from both types of fillings. The cherry pie fillings made from the distarch phosphate were fluid, of a very desirable consistency, clear and of a very attractive appearance. Those made from untreated waxy sorghum starch were unacceptably thin bodied so that much of the juice ran out of the pie. In comparison, fillings similarly made and used, employing untreated corn starch were opaque, whitish in appearance and gel-like in consistency.

EXAMPLE 15

*Use of distarch phosphate in cream style corn*

In canning sweet corn (cream style), field tests have shown that distarch phosphate prepared in accordance with Example 9 gave the same consistency to cream style corn as twice the weight of untreated corn starch. Moreover, the consistency was smoother with distarch phosphate since it was superior in preventing curdling of the sweet corn protein during the cooking and canning operation.

EXAMPLE 16

This example also shows the applicability of distarch phosphate in fruit fillings for pies.

Canned, sour, pitted cherries were drained to separate the juice from the meats. 160 liters of juice were diluted with 70 liters of water and while heating to about 95°

C., 100 kilos of sugar was dissolved in the liquor. To the heated solution was now added 74 kilos of distarch phosphate (75 minute sample of Example 8) which had been slurried in 70 liters of water. Heating was continued until the starch had gelatinized after which 192 kilos of drained cherry meats plus 70 kilos of sugar were stirred into the cooked mixture.

Pie crusts were then filled with the mixture prepared above and the pies were baked at 400° F. for approximately 30 to 35 minutes.

The pies were inspected after cooling to room temperature for 3 hours and again at the end of 24 hours.

For comparison, a batch of pies was made with corn starch and another batch with waxy sorghum starch using the proportions and procedure above given.

After 3 hours' cooling to room temperature, the pies containing the distarch phosphate were of clear, slightly fluid consistency, and accordingly presented a very appetizing appearance; the pies containing corn starch were slightly thinner and more opaque while the pies containing the waxy sorghum starch, although extremely clear, were so thin the filling had soaked badly into the lower crust and had boiled over the upper crust.

After 24 hours' storage, the pies containing the distarch phosphate presented substantially the same appearance as at the end of 3 hours; the pies containing corn starch had set up to an immobile, opaque gel while those containing waxy sorghum starch were extremely thin.

For commercial bakeries, where pies do not reach the ultimate consumer until many hours, perhaps a day or more, after baking, the advantage of using distarch phosphate to prepare a stable, clear, fruit filling is obvious.

EXAMPLE 17

This example shows among other things the stability of our distarch phosphates when used under conditions involving freezing and thawing.

Procedures given in the previous Example 16 for preparing fruit pie filling were repeated. However, after the fillings were placed in pie crusts, they were frozen and held at a temperature of $-17.7°$ C. ($0°$ F.) for 3 days while wrapped in a metal foil container to prevent moisture loss, then thawed and baked as in the preceding example.

Pies made with the distarch phosphate presented the same appearance as freshly made and baked pies formulated with this starch. Pies made with corn starch were a solid mass of opaque retrograded gel from which some thin watery liquid had synerized during thawing and baking to soak the crust. Pies containing waxy sorghum starch were exceedingly thin, both as baked and after aging, so that much of the filling had soaked into and overflowed the crust.

During recent years a merchandising innovation has been attempted by pie makers wherein unbaked, or partially baked, pies are frozen and distributed in the frozen state to retail stores where they are purchased by the ultimate consumer. The latter then thaws the pie and completes the baking. The disadvantage to this phase of frozen food manufacture has been heretofore that the commonly available starches used as pie filling thickeners have not been stable to the freeze thaw operation, or have been unstable in the presence of fruit acids and sugar, or both, and unacceptable products have resulted. The developent of a distarch phosphate for use as thickening agent in frozen pies and which would be stable under the conditions imposed is, therefore, a significant advancement in the art.

Our distarch phosphates have been found to be equally stable when used in other frozen food preparations, e. g., gravy, meat sauces.

EXAMPLE 18

This example together with previous examples and the one to follow shows the breadth of our invention in respect of use of distarch phosphate in products containing fruit and other acids, e. g., fruit fillings and fruit puddings.

A product made in accordance with the procedure of Example 9 having the following characteristics was used:

(1) D. S. of about 0.02 as monostarch phosphate, i. e., an average of 2 monophosphate ester groups per 100 anhydro glucopyranose groups.

(2) Scott viscosity 50–100 seconds per 50 ml. using 3 grams of 12 percent moisture distarch phosphate per 280 ml. of water.

(3) Clarity of a 1 percent paste about 50 to 65 percent.

This product was used in making a fruit pudding from cherries, in accordance with the method described in Example 14, using the same ratio of ingredients except the amount of distarch phosphate used corresponded to 4 lbs.

The resultant fruit pudding was superior to a pudding made from the same ratio of untreated corn starch in the following respects: The pudding containing the distarch phosphate was very clear, had good body and a relatively short texture consistency which gave a very pleasant taste and mouth feel. Moreover, the characteristics remained substantially unchanged when the pudding was aged for 24 hours. The pudding made from the untreated corn starch was of unacceptably thin consistency as first made and cooled. After 24 hours this pudding became an opaque, off-colored gel which masked the fruit and presented an unappetizing appearance and unpleasant taste.

EXAMPLE 19

An hydroxyethyl grain sorghum distarch phosphate made, in accordance with Example 10, was used in a fruit pudding. The distarch phosphate had the following characteristics:

(1) D. S. of about 0.04 as hydroxyethyl groups, i. e., an average of 4 hydroxyethyl groups per 100 anyhdro glucopyranose groups.

(2) Scott paste viscosity 30 to 50 seconds per 100 ml., using 10 grams of 12 percent moisture diphosphate starch in 280 ml. of water.

(3) Clarity of a 1 percent paste about 18 to 25 percent.

This product was used in making a fruit pudding from cherries, in accordance with the method described in Example 14, using the same ratio of ingredients except the amount of distarch phosphate corresponded to 4 lbs.

The resultant fruit pudding was superior to a pudding made from untreated hydroxyethyl corn starch in the following respects: The fruit pudding made with the hydroxyethyl grain sorghum distarch phosphate was very clear, heavy bodied, and had a relatively short textured consistency which gave a very pleasing taste and mouth feel. Moreover, the characteristics remained substantially constant when the pudding was aged 24 hours. On the other hand, a fruit pudding made with the same ratio of all ingredients, but substituting a 0.04 D. S. hydroxyethyl corn starch for the distarch phosphate derivative of the same hydroxyethyl corn starch, was unacceptably fluid in body and had a long, viscous, or glue-like consistency, which gave an unpleasant, slimy mouth feel.

EXAMPLE 20

This example demonstrates the use of waxy sorghum distarch phosphate having a viscosity of 100 seconds in peach pie filling. This viscosity was determined by Scott test in accordance with the procedure used in Example 7. Sliced, water-packed, cling peaches were used. The formulation was as follows:

| | | |
|---|---|---|
| Drained peaches | oz | 50 |
| Water | oz | 12 |
| Cane sugar | oz | 8 |
| Citric acid | grams | 5 |
| Waxy sorghum distarch phosphate | do | 54 |
| Waxy sorghum starch | do | 6 |

The starch was slurried in part of the water. The rest of the ingredients were heated to 190° F. and the starch slurry added and the mix was heated at 196° F. for 10 minutes. Pie crusts were filled with the mix.

A second pie was prepared in identical manner with the exception that 60 grams of waxy sorghum starch was used as the sole thickening agent.

Both pies were baked in an oven at 400° F. for 30 minutes and were allowed to cool to room temperature. They were inspected 3 hours after baking and again after 24 hours.

The pie filling containing the waxy sorghum distarch phosphate was very clear, had good body and the gelatinized thickening liquor clung well to the fruit particles; it had not overflowed the upper crust nor soaked into the lower crust. The appearance of the filling was the same at 24 hours age as at 3 hours.

The filling containing only the waxy sorghum starch as thickening agent was unacceptably thin-bodied, both at 3 hours' age and at 24 hours' age. The filling liquor had not held to the fruit and had overflowed the upper crust and had soaked into the lower crust.

EXAMPLE 21

This example shows the use of waxy sorghum distarch phosphate having a viscosity of 50 seconds in raw fruit pie fillings. The viscosity was measured by Scott test in the manner indicated in Example 7. The formulations for four fruits are listed below:

| Ingredient | Peach | Blueberry | Apple | Cherry |
| --- | --- | --- | --- | --- |
| Water_____lbs__ | 10 | 20 | 15 | 20 |
| Sugar_____lbs__ | 24 | 14 | 20 | 24 |
| Salt_____oz__ | 2 | 2 | 3 | 3 |
| Citric Acid_____oz__ | 1.5 | 1.5 | 1.5 | 2 |
| Starch Slurry [1]__lbs__ | 12 | 8 | 8 | 12 |

[1] Made at a ratio of 1 lb. of starch to 2.3 lbs. of water. Starch consists of 90 percent waxy sorghum distarch phosphate and 10 percent waxy sorghum starch.

All of the ingredients listed above except the starch slurry were heated to 90° C. and then the starch slurry was added and the mix cooked at 90° C. for 5 minutes. The resultant liquor was poured over the fresh fruit and pies were baked in conventional manner.

The baked pies were inspected at various intervals of times after cooling to room temperature. In all cases, the fruit pies which contained the distarch phosphate had a clear, slightly mobile filling of about the same consistency after 24 hours as when freshly baked. In all cases the filling clung well to the fruit meats.

In control tests wherein corresponding amounts of all waxy sorghum starch was used in the production of peach, blueberry, apple and cherry pies, the fillings were thin, soaking into the lower crust and boiling over the upper crust, and remained thin in consistency even 24 hours after baking.

The 10 percent addition of untreated waxy sorghum starch was made with the 90 percent distarch phosphate so as to give body quickly to the filling within the short period of precooking at 90° C. The distarch phosphate does not develop its full body until after longer cooking times, or when higher temperatures are used, such as are encountered, for example, in the actual baking of the pies.

The addition of a minor proportion, e. g. about 10 percent, of readily gelatinizing waxy starch to distarch phosphates, has also been found desirable in certain specific commercial canning processes producing canned fruit pie fillings, wherein the time or temperature used in the precooking step is not sufficient to develop a body to the liquor so as to hold the fruit meats uniformly suspended until the cans are filled, which are then subjected to a pressure cooking operation.

This application is a continuation-in-part of application Serial No. 448,359, filed August 6, 1954.

We claim:

1. A cooked fruit filling for pies and the like with improved stability against thinning and retrogradation comprising fruit, sugar and a distarch phosphate as a thickening agent; said distarch phosphate being insoluble in cold water and gelatinizable in hot water and being made by treating unswollen granule starch in aqueous slurry with a water soluble salt from the group consisting of metaphosphates and polymetaphosphates in the amount of at least about 0.01 percent, based on the dry weight of the starch, at a temperature sufficiently low to maintain the starch in unswollen granule state, and for a time to effect the desired degree of esterification, the pH of the system being maintained at at least about 9.0, thereafter neutralizing the system and washing with water and drying the resultant distarch phosphate.

2. A cooked fruit filling for pies and the like with improved stability against thinning and retrogradation comprising fruit, sugar and, as a thickening agent, a distarch phosphate being insoluble in cold water and gelatinizable in hot water and made by treating unswollen granule starch in aqueous slurry with sodium trimetaphosphate in the amount of at least about 0.01 percent, based on the dry weight of the starch, at a temperature sufficiently low to maintain the starch in unswollen granule state for a time to effect the desired degree of esterification, the pH of the system being maintained at at least about 9.0 and the sodium ion concentration at at least about 0.4 mole per liter during esterification, and thereafter neutralizing the system and washing the resultant distarch phosphate with water.

3. A cooked fruit filling for pies and the like with improved stability against thinning and retrogradation comprising fruit, sugar and, as a thickening agent, a corn distarch phosphate being insoluble in cold water and gelatinizable in hot water and made by treating unswollen granule corn monostarch phosphate in aqueous slurry with a water soluble salt from the group consisting of metaphosphates and polymetaphosphates at a temperature sufficiently low to maintain the monostarch phosphate in the unswollen granule state for a time to effect the desired degree of esterification, the pH of the system being maintained at at least about 9.0 and the amount of salt being at least about 0.01 percent, based on the dry weight of the monostarch phosphate.

4. A cooked fruit filling for pies and the like comprising fruit, sugar and, as a thickening agent, a waxy grain distarch phosphate made by treating unswollen granule waxy grain starch in aqueous slurry with a water soluble salt from the group consisting of metaphosphates and polymetaphosphates in the amount of at least about 0.01 percent, based on the dry weight of the starch at a temperature sufficiently low to maintain the starch in unswollen granule state until the Scott viscosity of a paste is reduced from about 160 to about 40 to 80 seconds per 50 ml., using 12 grams of starch product in 280 ml. of water and the clarity of a one percent paste is reduced to about 15 percent of the light transmission of water, the pH of the system being maintained at at least about 9.0, thereafter neutralizing the system and washing with water and drying the resultant distarch phosphate.

5. A cooked fruit filling for pies and the like comprising fruit, sugar, citric acid and, as a thickening agent, hydroxyethyl grain sorghum distarch phosphate having a D. S. in respect to hydroxyethyl of about 0.04 and a Scott paste viscosity of 30 to 50 seconds per 10 ml., using 10 grams of 12 percent moisture distarch phosphate in 280 ml. of water and clarity of a one percent paste reduced to about 18 to 25 percent of the light transmission of water, said distarch phosphate being made by treating unswollen granule hydroxyethyl grain sorghum starch in aqueous slurry with a water soluble salt from the group consisting of metaphosphates and polymetaphosphates in the amount of at least about 0.01 percent, based on the dry weight of the starch, at a temperature sufficiently low to maintain the starch in unswollen granule state until the aforementioned viscosity of a paste is obtained.

References Cited in the file of this patent

UNITED STATES PATENTS

| | | |
|---|---|---|
| 2,252,479 | Beyer | Aug. 12, 1941 |
| 2,461,139 | Caldwell | Feb. 8, 1949 |
| 2,575,352 | Lohmar | Nov. 20, 1951 |

FOREIGN PATENTS

| | | |
|---|---|---|
| 70,237 | Switzerland | May 8, 1913 |

UNITED STATES PATENT OFFICE
CERTIFICATE OF CORRECTION

Patent No. 2,852,393　　　　　　　　　　　　　　　September 16, 1958

Ralph W. Kerr et al.

It is hereby certified that error appears in the printed specification of the above numbered patent requiring correction and that the said Letters Patent should read as corrected below.

Column 3, line 15, for "likes" read -- like --; column 6, line 41, for "atfer" read -- after --; column 7, Table IV, in the heading of the first four columns, and in the heading of the fifth column, for "$10^3$", each occurrence, read -- $10^{-3}$ --; column 9, line 40, for "application" read -- applications --; column 13, line 66, for "developent" read -- development --; column 16, line 72, for "10 ml" read -- 100 ml --.

Signed and sealed this 6th day of January 1959.

(SEAL)
Attest:

KARL H. AXLINE
Attesting Officer

ROBERT C. WATSON
Commissioner of Patents